US012337339B2

(12) United States Patent
Alluigi

(10) Patent No.: US 12,337,339 B2
(45) Date of Patent: Jun. 24, 2025

(54) TRIGGER DISPENSING DEVICE

(71) Applicant: GUALA DISPENSING S.P.A., Alessandria (IT)

(72) Inventor: Riccardo Alluigi, Alessandria (IT)

(73) Assignee: Guala Dispensing S.P.A., Alessandria (IT)

( * ) Notice: Subject to any disclaimer, the term of this patent is extended or adjusted under 35 U.S.C. 154(b) by 112 days.

(21) Appl. No.: 18/042,921

(22) PCT Filed: Nov. 4, 2021

(86) PCT No.: PCT/IB2021/060225
§ 371 (c)(1),
(2) Date: Feb. 24, 2023

(87) PCT Pub. No.: WO2022/112889
PCT Pub. Date: Jun. 2, 2022

(65) Prior Publication Data

US 2023/0364629 A1 Nov. 16, 2023

(30) Foreign Application Priority Data

Nov. 24, 2020 (IT) ........................ 102020000028214

(51) Int. Cl.
*B05B 11/00* (2023.01)
*B05B 11/10* (2023.01)

(52) U.S. Cl.
CPC ........ *B05B 11/104* (2023.01); *B05B 11/1057* (2023.01); *B05B 11/1064* (2023.01)

(58) Field of Classification Search
CPC ............. B05B 11/1057; B05B 11/1067; B05B 11/1064; B05B 11/104; B05B 11/1011
See application file for complete search history.

(56) References Cited

U.S. PATENT DOCUMENTS

2013/0221033 A1* 8/2013 Alluigi ................ B05B 11/1023
222/383.1

FOREIGN PATENT DOCUMENTS

CN 208230166 U 12/2018
WO 2014013352 A1 1/2014

OTHER PUBLICATIONS

International Search Report and Written Opinion for International Patent Application No. PCT/IB2021/060225, mailed Jan. 27, 2022, 14 pages.
International Preliminary Report on Patentability for International Patent Application No. PCT/IB2021/060225, mailed Aug. 16, 2022, 20 pages.

* cited by examiner

*Primary Examiner* — Vishal Pancholi
(74) *Attorney, Agent, or Firm* — Armstrong Teasdale LLP

(57) ABSTRACT

A trigger dispensing head applicable to a bottle suitable for containing a product to be dispensed is provided. The trigger dispensing head has valve elements having a dome-shaped valve body provided with an elastically deformable membrane. The elastically deformable membrane has an annular sealing ring that forms a head seal of a pre-stressing valve.

9 Claims, 3 Drawing Sheets

TRIGGER DISPENSING DEVICE

CROSS-REFERENCE TO RELATED APPLICATIONS

This application is a National Stage Application of International Patent Application No. PCT/IB2021/060225, having an International Filing Date of Nov. 4, 2021, which claims priority to Italian Application No. 102020000028214, filed Nov. 24, 2020, the entire contents of each of which are hereby incorporated by reference herein.

FIELD OF THE INVENTION

This invention is in the field of trigger devices for dispensing a product; in particular, the object of this invention is a trigger device equipped with an innovative pre-stressing valve.

BACKGROUND OF THE INVENTION

These devices are widely used on the market for countless purposes; for example, they are used to dispense products for surface hygiene, to deodorize environments, to facilitate the ironing of clothing, for personal care, for plant care, and for many other purposes.

One of the most popular features of said trigger dispensers is the ability to pre-stress the product to be dispensed, before it is dispensed. This provides many benefits, such as a more uniform spray pattern and finer distribution of the droplets dispensed. There are many solutions of trigger dispensers equipped with a valve for pre-stressing the product. For example, one solution is outlined in WO-A1-2014/013352 in the name of the Applicant.

However, the solutions known today have some drawbacks, such as the need to provide components with very tight manufacturing tolerances in order to ensure optimal operation of the pre-stressing valve.

SUMMARY OF THE INVENTION

The object of this invention is to provide a trigger dispenser that overcomes these drawbacks and meets the above requirements.

This object is achieved by a trigger dispensing head as described and claimed herein. Additional advantageous embodiments of the present invention are also described.

BRIEF DESCRIPTION OF THE FIGURES

The features and advantages of the trigger dispenser according to this invention will be apparent from the description below, given by way of non-limiting example, according to the figures in the accompanying drawings, wherein.

DETAILED DESCRIPTION

Figure 1A:
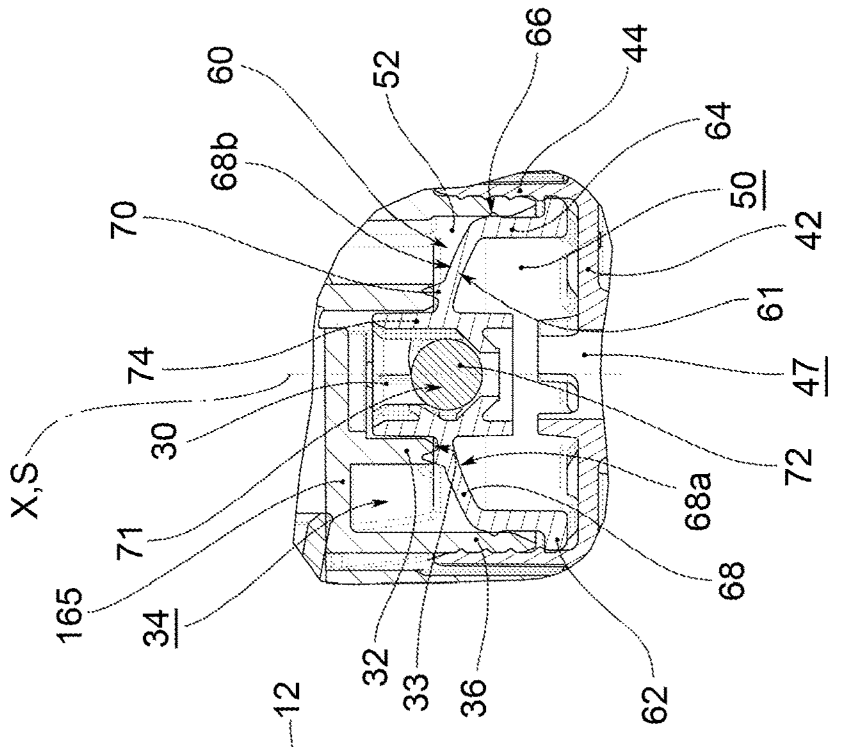
FIG. 1*a* is an enlargement of inset Ia of FIG. 1, depicting valve means of the dispensing head.

A trigger dispenser according to this invention comprises a bottle for containing a product to be dispensed provided with a neck having a main axis X with a mouth and a trigger dispensing head 10 applicable to the neck of the bottle, for example in a removable manner.

For example, the dispensing head is attached to the bottle via a threaded closure comprising a threaded ring screwable to the neck and adapted to retain the head to the neck of the bottle; according to a further example, the head is applied to the bottle via a bayonet closure.

The head 10 comprises a frame 12 for supporting the components. Preferably, the frame 12 is made of plastic material in a single piece, for example by injection molding.

The head 10 further comprises a piston 14 and a piston chamber 16, for example formed in the frame 12, within which the piston 14 sealably slides along a piston axis Y, preferably incident to the main axis X, for example orthogonal thereto.

The head 10 further comprises a manually operable trigger 18 supported by the frame 12, for example hinged in a rotatable manner or driven in a translatable manner, connected to the piston 14.

The head 10 further comprises elastic return means, for example comprising a spring, adapted to permanently urge the trigger or piston towards an initial resting configuration.

The head 10 further comprises a dispensing pipe 20 in communication, at a first end 22, with the external environment, for example via a nozzle 24 of the head 10 supported by the frame 12. The dispensing pipe 20 extends along a dispensing axis Z, preferably parallel to the piston axis Y.

The head 10 further comprises a secondary pipe 26, connected at one end to a second end 28 of the dispensing pipe 20, and at the other end connectable to the chamber 16. The secondary pipe 26 extends along a secondary axis K, preferably parallel to the main axis X.

The head 10 further comprises a primary pipe 30 exiting the chamber 16, peripherally delimited by an annular primary wall 32, for example in one piece with the frame 12, preferably coaxial to the main axis X.

The primary wall 32 has an inner side surface 32*a*, facing the primary pipe 30, and an opposite outer side surface 32*b*, facing the delivery compartment 52 discussed hereinafter.

The head 10 also has a compartment 34 connected upstream to the primary pipe 30 and downstream to the secondary pipe 26.

The compartment 34 is annularly delimited by an annular compartment wall 36, for example made in one piece with the frame 12, preferably coaxial to the main axis X, arranged radially outside the primary wall 32.

The primary wall 32 ends in the compartment 34 with a head surface 32*c* facing into the compartment 34, for example, circular crown- or truncated cone-shaped, joining the inner side surface 32*a* and the outer side surface 32*b*.

Preferably, the primary wall 32 extends from a chamber wall 165 of the frame 12 that annularly delimits the piston chamber 16.

Preferably, the primary wall 32 extends along a wall axis S, for example coincident with the major axis X.

Preferably, the head surface 32*c* annularly delimits a pipe mouth 33 connecting the primary pipe 30 with the compartment 34.

The head 10 further comprises an auxiliary body 40 connectable, for example by snap-on connection, with the frame 12, to at least partially delimit the compartment 34. The auxiliary body 40 is engageable to the compartment wall 36, for example by means of a threaded or snap-on connection.

For example, the auxiliary body 40 comprises a base 42, lying substantially in a plane orthogonal to the major axis X, a side wall 44, projecting axially peripherally from the base 42, connectable to the compartment wall 36, and an extension 46, projecting axially from the base 42, on the opposite portion of the side wall 44, having a suction hole 47 passing through the thickness of the base 42. A small tube 48 is insertable in the suction hole 47 for draining the product.

The head 10 further comprises valve means for dispensing and suctioning the product. The valve means comprise:

- dispensing valve means adapted to allow the product to pass from the piston chamber to the dispensing pipe in a product dispensing phase and to prevent the product from returning from the dispensing pipe to the piston chamber in a product suction phase;
- suction valve means adapted to allow the product to pass from the bottle to the piston chamber in a product suction phase and to prevent the product from returning from the piston chamber to the bottle in a product dispensing phase.

Valve venting means are also provided to allow air to enter the bottle during a suction phase of the product from the bottle.

The valve means are housed in the compartment 34 and comprise a valve body 60, for example made in one piece of plastic material.

The dome-shaped valve body 60 comprises an annular valve wall 61 comprising an annular, preferably wavy, body foot 62 resting on the base 42 of the auxiliary body 40, preferably abutting against the side wall 44 of said auxiliary body 40. Preferably, the body foot 62 is mechanically engaged, for example by snapping or by means of threads, to the side wall 44 or to the compartment wall 36, forming an example of an application of the auxiliary body 40 to the compartment wall 36.

The valve wall 61 further comprises an annular body wall 64 having a predetermined axial extension, projecting from the body foot 62. Preferably, the body wall 64 is in contact with the compartment wall 36, forming a seal, for example via a sealing lip 66.

The valve wall 61 further comprises an elastically deformable membrane 68 protruding from, for example, the body wall 64, configured to come in contact with the primary wall 32 of the frame 12, forming a seal. In particular, the membrane 68 comprises a sealing ring 70, for example having a triangular or cusp-shaped cross-section, configured to come in contact and form a seal with the head surface 32*c* of the primary wall 32.

The valve wall 61 divides the compartment 34 into a suction compartment 50, connected to the suction hole 47, and a delivery compartment 52, connected to the secondary pipe 26.

The membrane 68, in particular with the sealing ring 70, and the primary wall 32, with the head surface 32*c*, form pre-stressing valve means adapted to allow product to pass from the piston chamber 16 to the dispensing pipe 20 when the pressure in the piston chamber 16 exceeds a predetermined threshold value, and to prevent the passage of product from the piston chamber 16 to the dispensing pipe 20 when the pressure in the piston chamber 16 is less than a predetermined threshold value.

In other words, in a first sub-step of the dispensing phase, when the piston starts from the resting configuration and moves into the piston chamber, the pressure in the piston chamber increases, but the pre-stressing valve means remain closed, preventing product from passing into the secondary pipe 26.

In said first sub-step, the product accumulates in the primary pipe 30 and the increase in pressure is absorbed by a portion of the membrane, typically that within the sealing ring 70, whether or not it undergoes local deformation.

Once a threshold pressure has been exceeded, in a second sub-step of the dispensing phase, the pre-stressing valve means open and allow product to pass from the piston chamber 16, through the pipe mouth 33 of the primary pipe 30, to the dispensing pipe 20.

In said second sub-step, the deformation of the membrane, and in particular the lowering thereof, allows the sealing ring 70 to be separated from the head surface 32*c* of the primary wall 32, allowing the passage of the product.

The suction valve means comprise, for example, a suction passage 71 passing through the membrane 68 of the valve body 60, connecting the primary pipe 30 and the suction compartment 50, the mouth of which, on the side of the primary pipe 30, is surrounded by the sealing ring 70.

Said suction valve means further comprise a ball 72, arranged in the suction passage 71, movable between a position where it closes the suction passage 71, in the product dispensing phase, and a position where it leaves the suction passage at least partially open, in the product suction phase.

Preferably, the suction passage 71 is annularly delimited by an annular passage wall 74, which protrudes from the membrane 68, concentrically to the sealing ring 70, and extends axially into the primary pipe 30 and the suction compartment 50.

In an embodiment, during the first sub-step, the product accumulates radially internally to the passage wall 74.

Preferably, the passage wall 74 is significantly separated from the inner side surface 32*a* of the primary wall 32. For example, the passage wall 74 is inserted into the primary pipe 30, substantially free to move axially during the deformation of the membrane 68.

In other words, the passage wall 74 is inserted with clearance through the pipe mouth 33.

Preferably, the product also seeps in negligible amounts between the passage wall 74 and the inner side surface 32*a*. In other words, the passage wall 74 and the inner side surface 32*a* are unsealed.

The membrane 68 of the valve body 60 has a suction side face 68*a*, facing the suction compartment 50, and a delivery side face 68*b*, facing the delivery compartment 52.

In an embodiment, the sealing ring 70 is made external to the passage wall 74, relative to the wall axis S. Preferably, the sealing ring 70 protrudes from the delivery side face 68*b* of the membrane 68.

Figure 1:
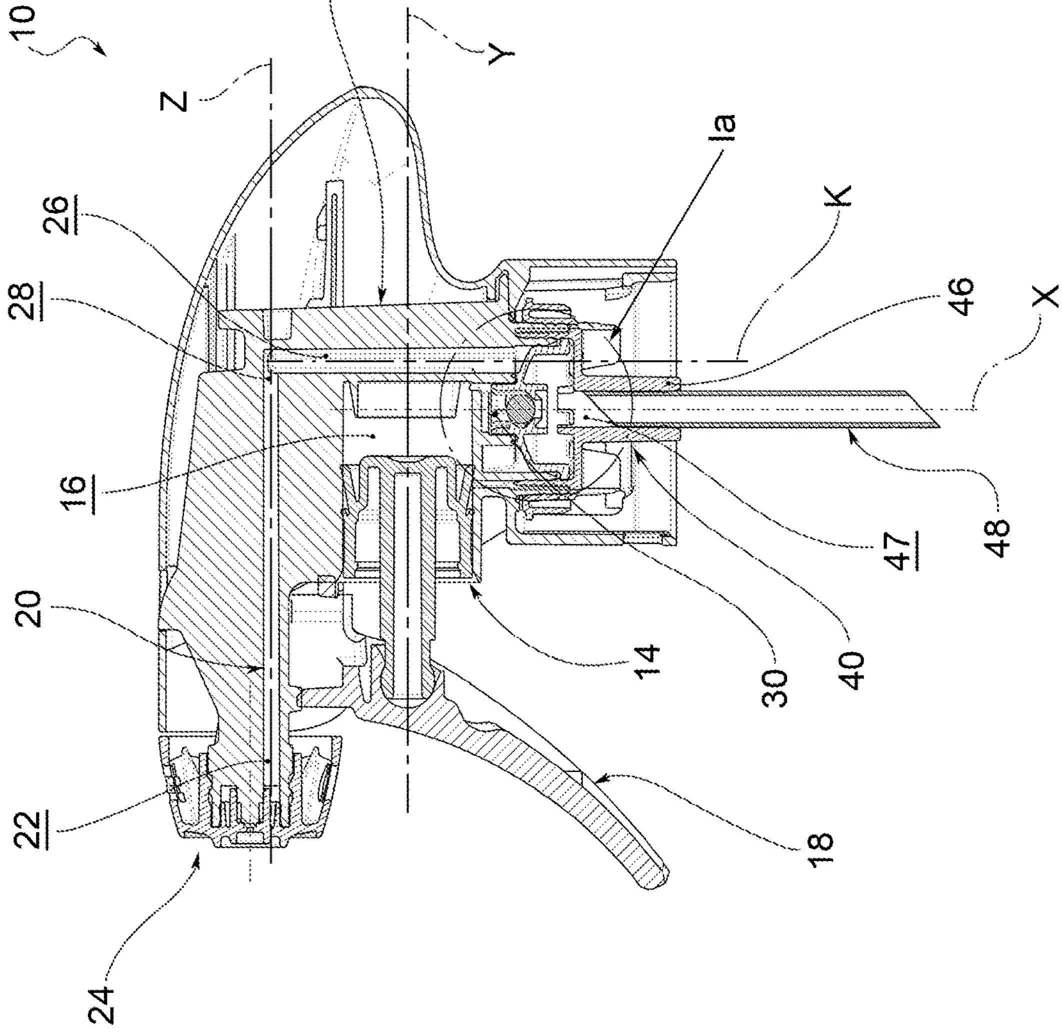
FIG. 1 depicts a sectional view of a trigger dispensing head of a dispenser according to one embodiment of this invention.

According to an embodiment (FIGS. 1 and 1*a*), the membrane 68 has an overall convex shape towards the delivery side, i.e., the delivery side face is convex, and the suction side face is concave.

Figure 2A:
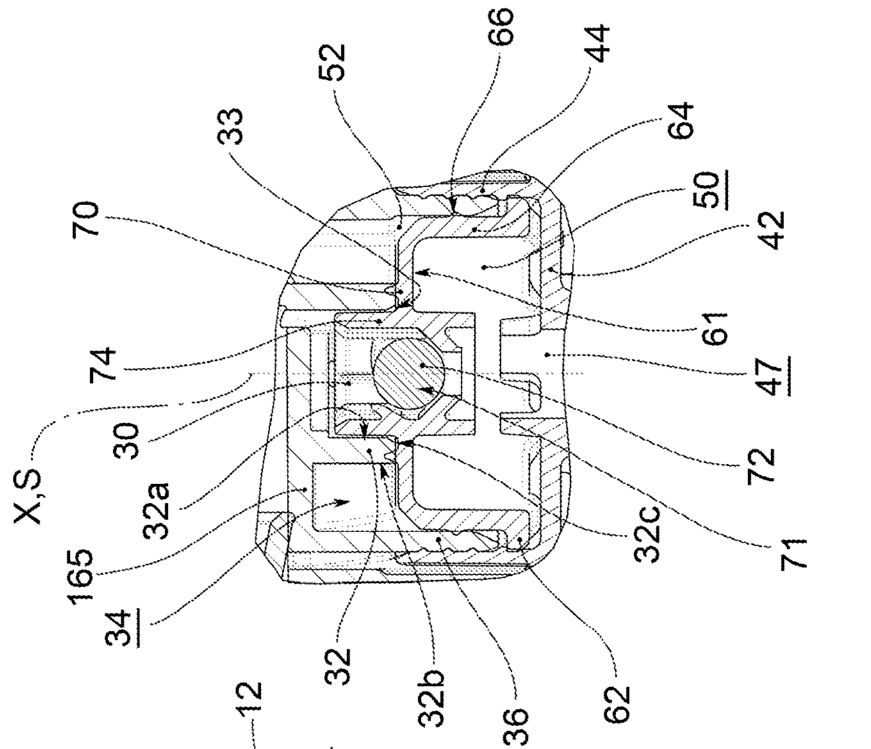
FIG. 2*a* is an enlargement of the inset IIa of FIG. 2, depicting valve means of the dispensing head.
Figure 2:
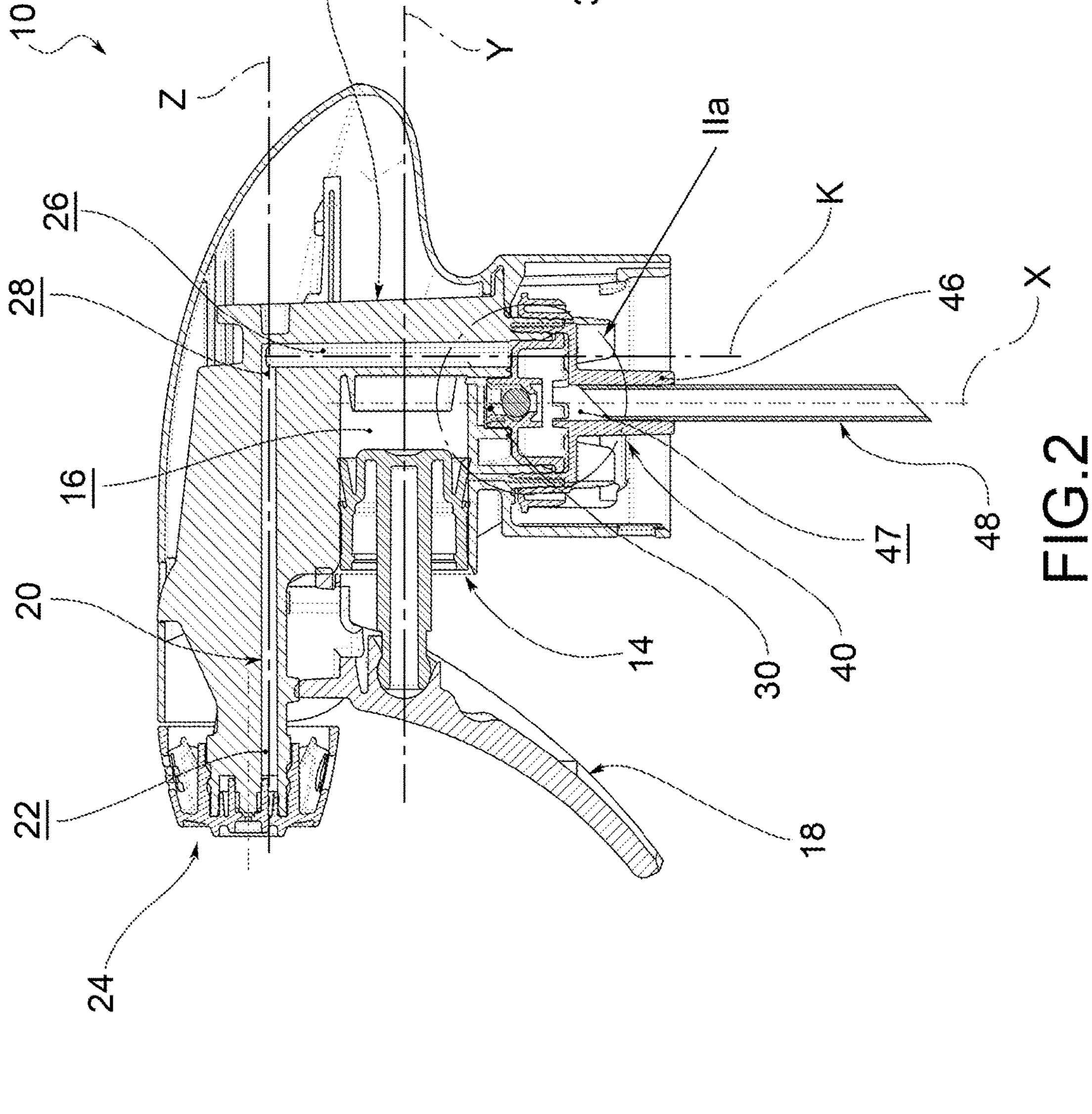
FIG. 2 depicts a sectional view of a trigger dispensing head of a dispenser according to a further embodiment of this invention.

According to a further embodiment (FIGS. 2 and 2*a*), the membrane 68 has an overall flat shape, i.e., the delivery side face is flat, and the suction side face is flat.

Figure 3A:
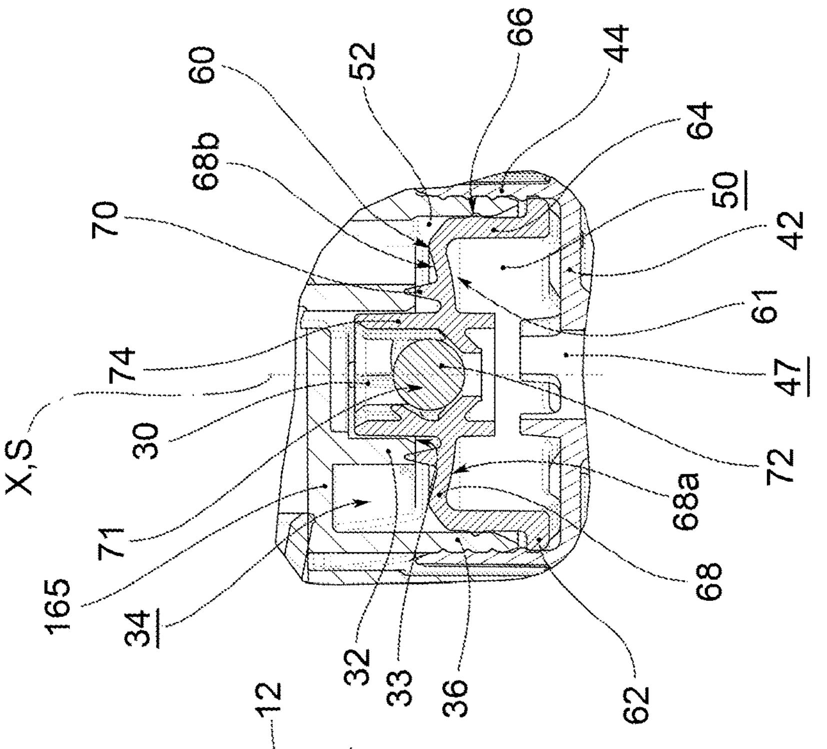
FIG. 3*a* is an enlargement of the inset IIIa of FIG. 3, depicting valve means of the dispensing head.
Figure 3:
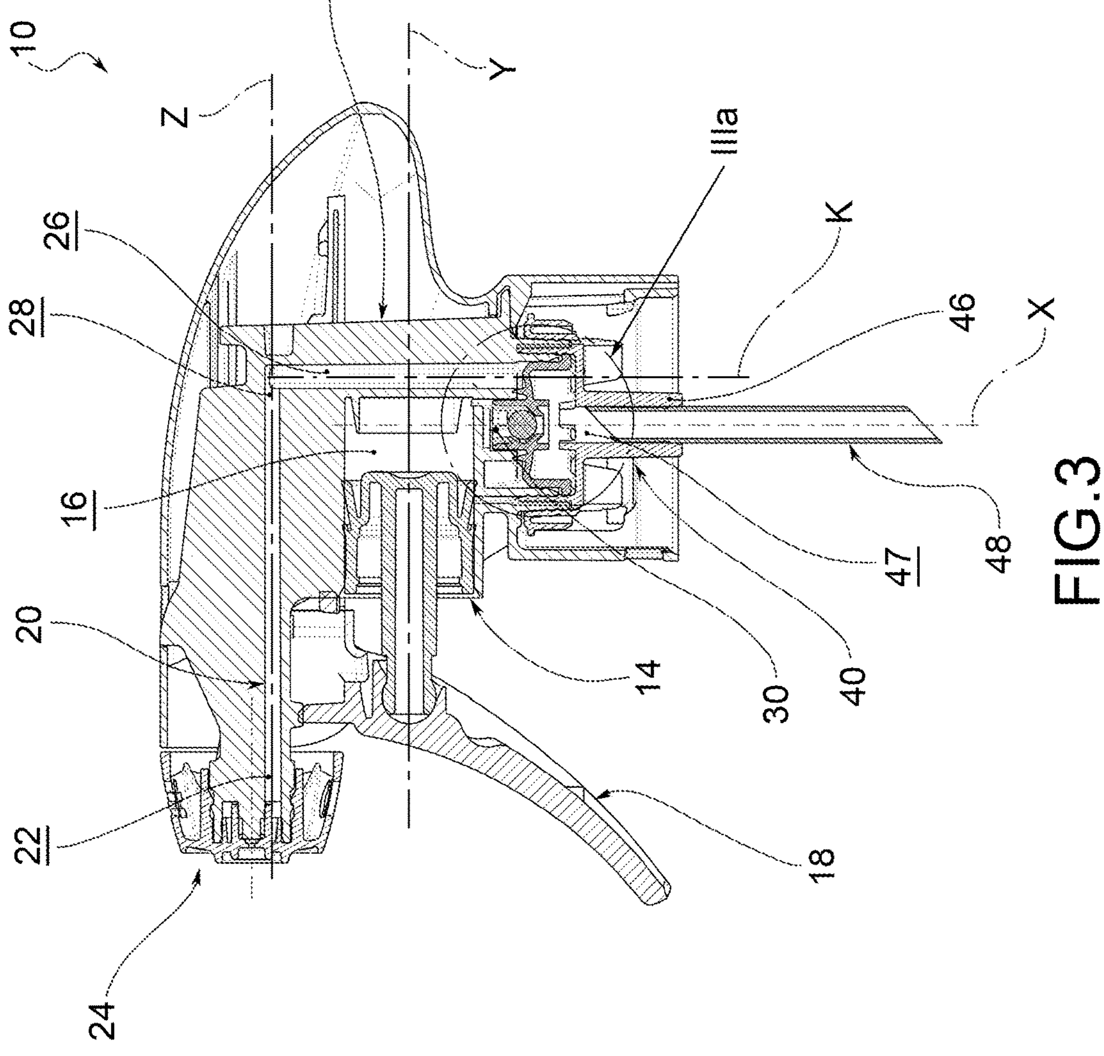
FIG. 3 depicts a sectional view of a trigger dispensing head of a dispenser according to a still further embodiment of this invention.

According to a still further embodiment (FIGS. 3 and 3*a*), the membrane 68 has an overall concave shape toward the delivery side, i.e., the delivery side face is concave, and the suction side face is convex.

According to one variation, the suction valve means comprise a flexible obturator portion, made in one piece with the membrane, adapted to open and close the suction passage.

Innovatively, the dispensing head according to this invention overcomes the aforementioned drawbacks in that the configuration of the pre-stressing valve means, provided with a head seal, forms a very effective seal that is easy to implement.

Advantageously, the passage wall is easy to manufacture and is not subject to strict manufacturing tolerances since it is not used for the sealing function.

The invention claimed is:

1. A trigger dispensing head applicable to a bottle suitable for containing a product to be dispensed, comprising:

a piston chamber, a piston sealably sliding in the piston chamber and a manually operable trigger connected to the piston for dispensing and suctioning the product;

a primary wall delimiting a primary pipe exiting the piston chamber;

an annular compartment wall delimiting a compartment downstream of the primary pipe;

a secondary pipe, downstream of the compartment, and a dispensing pipe, downstream of the secondary pipe, in connection with an external environment;

an auxiliary body connected to the annular compartment wall, comprising a base and a suction hole passing through the base;

valve means for suctioning and dispensing the product;

wherein the valve means are housed in the compartment and comprise a dome-shaped valve body supported by the base of the auxiliary body and comprising an at least partially deformable annular valve wall;

wherein the at least partially deformable annular valve wall divides the compartment into a suction compartment in communication with the suction hole and a delivery compartment in communication with the secondary pipe;

wherein the at least partially deformable annular valve wall comprises an elastically deformable membrane;

wherein the primary wall comprises an inner side surface facing towards the primary pipe, an outer side surface facing towards the delivery compartment, and ends in a circular crown-shaped head surface joining the inner side surface and the outer side surface and facing the compartment; and wherein the elastically deformable membrane comprises an annular seal ring abutting the circular crown-shaped head surface of the primary wall, forming pre-stressing valve means configured to allow passage of the product towards the dispensing pipe when pressure in the piston chamber exceeds a predefined threshold value.

2. The trigger dispensing head of claim 1, wherein the circular crown-shaped head surface annularly delimits a pipe mouth connecting the primary pipe to the compartment.

3. The trigger dispensing head of claim 1, wherein the elastically deformable membrane comprises a suction side face facing towards the suction compartment, and a delivery side face facing towards the delivery compartment.

4. The trigger dispensing head of claim 3, wherein the elastically deformable membrane has an overall convex shape towards a delivery side, the delivery side face being convex and the suction side face being concave.

5. The trigger dispensing head of claim 3, wherein the elastically deformable membrane has an overall flat shape, the delivery side face being flat and the suction side face being flat.

6. The trigger dispensing head of claim 3, wherein the elastically deformable membrane has an overall convex shape towards a delivery side, the delivery side face being concave and the suction side face being convex.

7. The trigger dispensing head of claim 1, wherein the valve means comprise suction valve means comprising a suction passage passing through the elastically deformable membrane of the dome-shaped valve body, which connects the primary pipe and the suction compartment, a mouth of which, on a side of the primary pipe, is surrounded by the annular seal ring; and a ball, arranged in the suction passage, movable between a position in which the ball closes the suction passage and a position in which the ball leaves the suction passage at least partially open.

8. The trigger dispensing head of claim 7, wherein the suction passage is annularly delimited by an annular passage wall projecting from the elastically deformable membrane, concentrically to the annular seal ring, and extending axially into the primary pipe and the suction compartment.

9. A dispenser comprising:

a bottle suitable for containing a product to be dispensed; and a trigger dispensing head according to claim 1.

* * * * *